United States Patent [19]

Hendricks

[11] Patent Number: 5,037,152
[45] Date of Patent: Aug. 6, 1991

[54] COLLAPSIBLE TRUCK RACK
[75] Inventor: Jeffrey L. Hendricks, Norcross, Ga.
[73] Assignee: PWHH, Inc., Atlanta, Ga.
[21] Appl. No.: 603,400
[22] Filed: Oct. 26, 1990
[51] Int. Cl.⁵ .............................................. B60P 3/00
[52] U.S. Cl. ...................................... 296/3; 296/26
[58] Field of Search ................... 296/3, 26, 37.6; 224/42.34, 42.44, 42.45 R

[56] References Cited
U.S. PATENT DOCUMENTS

| | | | |
|---|---|---|---|
| 4,211,448 | 7/1980 | Weston | 296/3 |
| 4,267,894 | 5/1981 | Lewis | 224/42.34 |
| 4,659,131 | 4/1987 | Flournoy, Jr. | 296/3 |
| 4,779,916 | 10/1988 | Christie | 296/3 |
| 4,906,038 | 3/1990 | Morris | 296/3 |

Primary Examiner—Robert R. Song
Attorney, Agent, or Firm—Thomas, Kerr & Kayden

[57] ABSTRACT

A collapsible carrying rack for pick-up trucks comprises four upstanding arms that support spaced horizontal support beams that extend above and transverse with respect to the truck bed. The rack is adapted to be collapsed and folded out of the way into small elongated receptacles mounted to the sides of the truck bed when the rack is not in use.

7 Claims, 2 Drawing Sheets

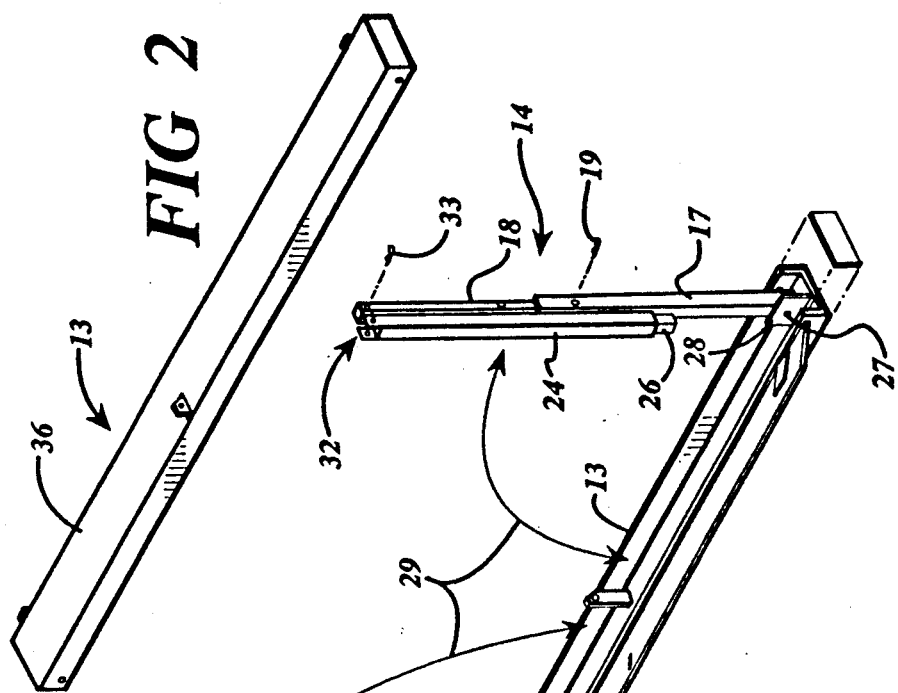
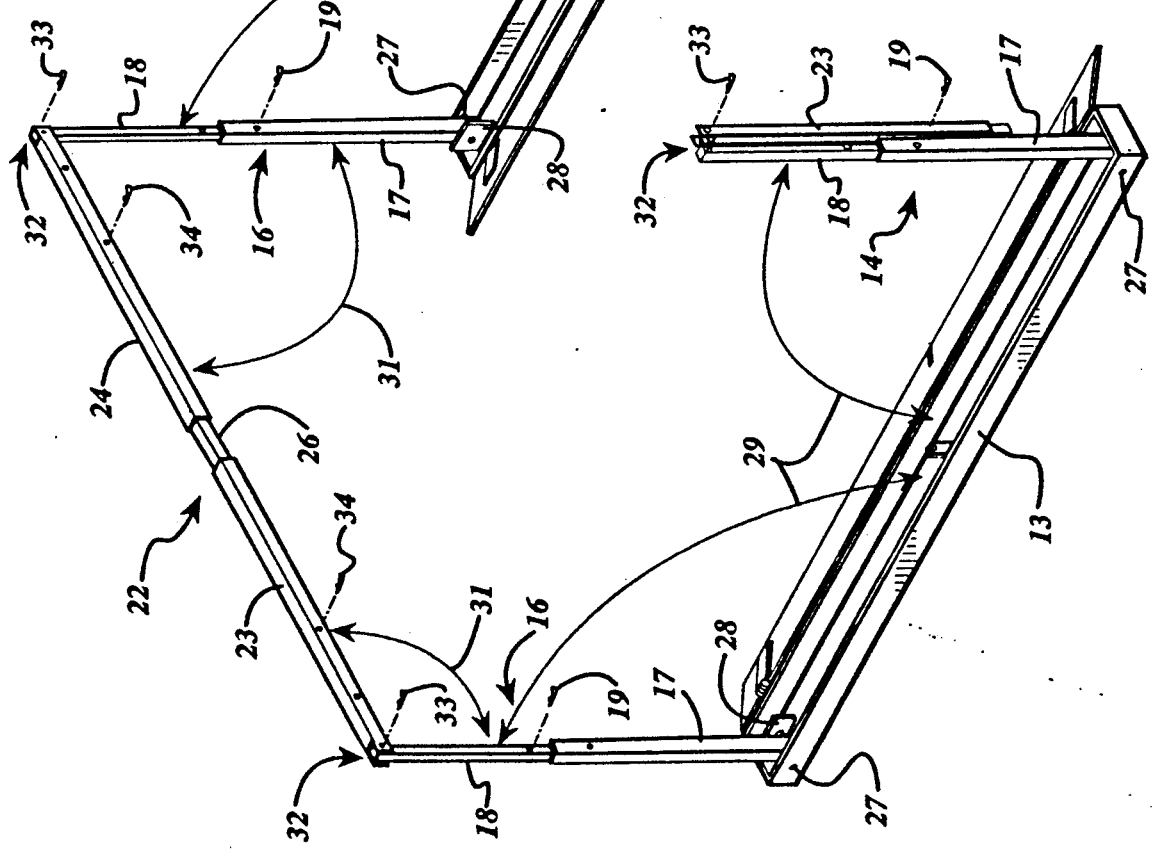

COLLAPSIBLE TRUCK RACK

TECHNICAL FIELD

This invention relates to automotive accessories and particularly to carrying racks for pick-up trucks and the like.

BACKGROUND OF THE INVENTION

The classic pick-up truck has long been the working vehicle of painters, plumbers, electricians and other tradesmen in part because of its ability to carry tools and other equipment. Many such tradesmen equip their pick-up trucks with an overhead rack that typically includes a frame extending upwardly from the sides of the truck bed and defining an overhead support for receiving and carrying ladders, pipe, lumber and similar items. In this way, such items can be carried on the rack above the bed of the truck so that the bed is free for carrying additional smaller items.

While the common truck rack has proven extremely useful in increasing the carrying capacity of a pick-up truck, it has nevertheless been plagued with a number of inherent shortcomings and problems. Most truck racks, for example, are constructed of heavy welded metal frames that are either permanently secured to the truck bed or are very difficult to remove. These racks consequently limit the ability of the truck to haul items that are taller than the height of the rack. Where such racks are removable, their large heavy construction makes them difficult and unsightly to store while not secured to the truck. In addition, since the removed rack does not accompany the truck, it is not available for use should a need arise while the truck is away from the storage location.

Thus, a continuing and heretofore unaddressed need exists for a truck rack adapted to satisfy the needs of tradesmen who use such racks while simultaneously addressing the problems inherent in prior art racks discussed above. It is to the provision of such a truck rack that the present invention is primarily directed.

SUMMARY OF THE INVENTION

The present invention comprises a carrying rack for pick-up trucks that can be erected to support ladders, pipes and the like above the truck bed and, when not in use, can be collapsed and stored out of the way within storage receptacles that are secured to and extend along the sides of the truck bed. A pair of telescopically adjustable arms extend upwardly from the rear end of each receptacle in opposed relationship at the rear of the truck bed and a corresponding pair of telescopically adjustable arms extend upwardly from the front of each receptacle in opposed relationship at the front of the truck bed. Horizontal support beams extend between the upper portions of the opposed rear arms and between the upper portions of the opposed front arms to define a rack upon which ladders, pipes and the like can be supported and secured.

When not in use, the rack can be collapsed by decoupling each horizontal support beam at its mid section, pivoting the decoupled sections downwardly beside their respective vertical arms, telescopically collapsing each vertical arms and folding the collapsed arms and horizontal arm sections downwardly into their corresponding elongated receptacles. Each receptacle has a hinged cover that closes the receptacle and secures the collapsed rack portions therein.

Thus, a pick-up truck rack is now provided that, like prior art racks, is configured to support ladders, pipes and the like above the bed of the pick-up truck to increase the truck's hauling capacity. When not in use, the entire rack is easily collapsed and stored away in small elongated receptacles so that the rack is out of the way for hauling tall or oddly shaped items. Since the rack remains with the truck at all times, it is always available when needed for supporting and hauling items.

It is therefore an object of this invention to provide a carrying rack for pick-up trucks adapted to support ladders, pipes and the like above the bed of the truck.

Another object of the invention is to provide a rack for pick-up trucks that is easily collapsed and stored out of the way when not in use.

An additional object of the invention is to provide a collapsible rack for pick-up trucks that is economical to produce and easy to install and use.

These and other objects, features, and advantages of the present invention will become more apparent upon review of the following detailed description taken in conjunction with the accompanying drawings.

BRIEF DESCRIPTION OF THE DRAWINGS

FIG. 2 is a perspective illustration of one of the elongated receptacles that hold and secure the rack out of the way when in its collapsed storage configuration.

FIG. 3 is a perspective, partially exploded view of a truck rack that embodies principles of the present invention in a preferred form.

DETAILED DESCRIPTION

Figure 1:
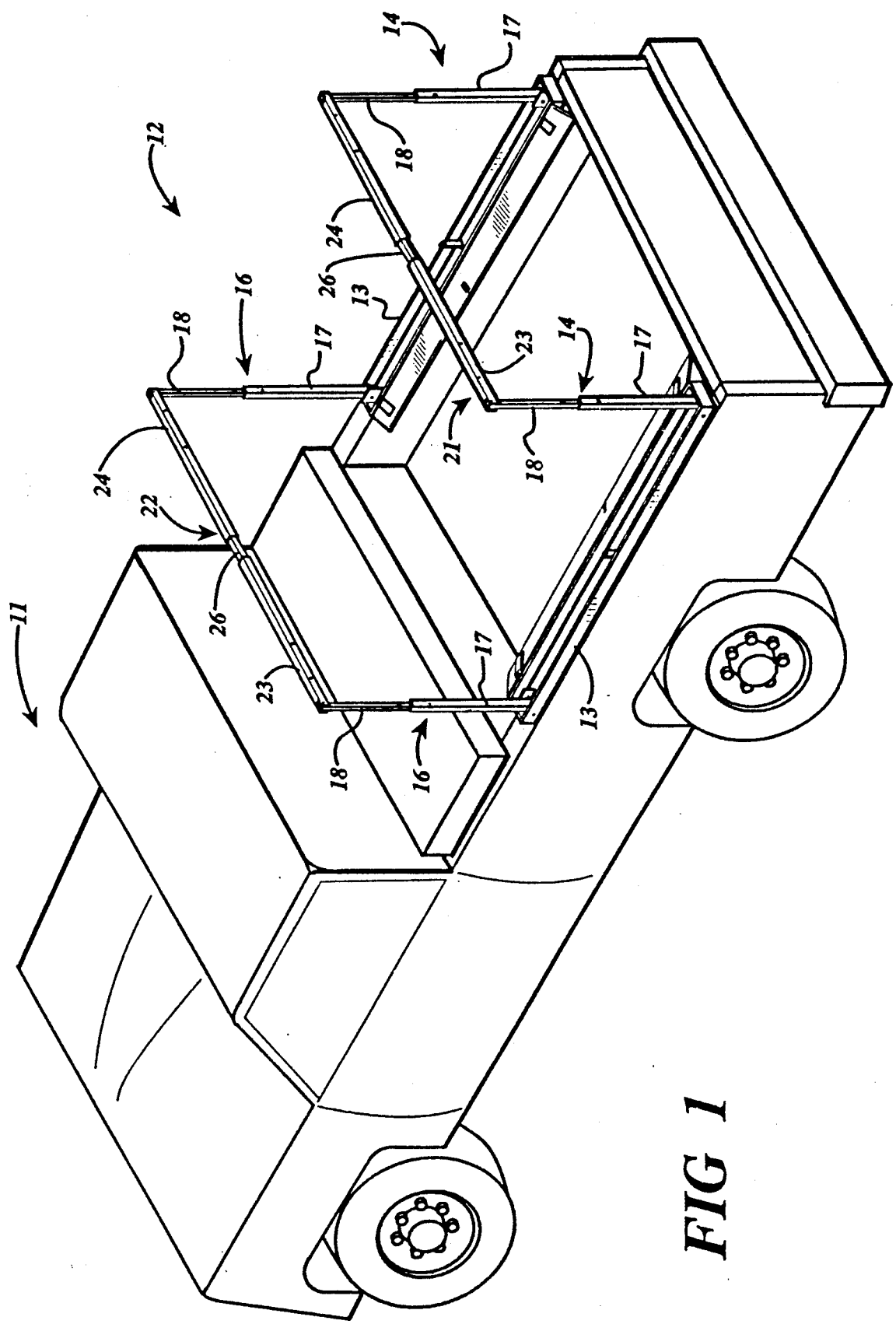
FIG. 1 is a perspective view of a pick-up truck with the rack of the present invention mounted thereto and erected to its support configuration.

Referring now in more detail to the drawings, in which like numerals refer to like parts throughout the several views, FIG. 1 illustrates a pick-up truck 11 bearing a rack assembly 12 that embodies principles of the invention in a preferred form. The assembly 12 is seen to comprise a pair of elongated receptacles 13 mounted to and extending along the top edges of opposed sides of the truck bed. An upstanding arm 14 extends vertically from within the rear portion of each receptacle 13 with the rear arms 14 being positioned in spaced transversely opposed relationship relative to the rear portion of the truck bed. Similarly, a front arm 16 extends vertically from within the front end portion of each receptacle 13 with the front arms 16 being positioned in spaced transversely opposed relationship relative to the front portion of the truck bed.

The vertically extending arms 14 and 16 are all of similar construction and are preferably made of a light tubular metal stock such as aluminum. Each arm is defined by a lower member 17 that is pivotally secured at its lower end to the interior of the receptacle. An upper member 18 is telescopically mounted within each lower member 17 such that the length of each of the arms 14 and 16 is telescopically adjustable by axial movement of the upper member 18 within the lower member 17. A set of pins 19 (FIG. 3) are adapted to extend through aligned bores in the lower and upper members 17 and 18 to secure the upper members in a preselected telescopic position relative to the lower members and thus secure the arms at a preselected height.

A rear support beam 21 is secured at its ends to the upper portions of rear support arms 14 and extends therebetween above and transversely with respect to the bed of the truck. Similarly, a front support beam 22 is secured at its ends to the upper portions of front arms 16 and extends therebetween above and transversely with respect to the bed of the truck. The rack assembly 12 is preferably constructed such that with all upstanding arms adjusted to the same telescopic length, the front and rear support beams lie substantially in a horizontal plane. In this way, ladders, pipes, lumber and other long items can be supported atop the support beams and secured thereto for transport.

Each of the support beams 21 and 22 is formed by a tubular metal left hand member 23 that is pivotally secured to the upper portion of its corresponding upstanding arm and a right hand member 24 that is likewise pivotally secured to the upper portion of the opposed upstanding arm. The left and right hand members 23 and 24 are adapted to be releasably but securely coupled together at their free ends when pivoted upwardly to their horizontally extending support orientations as shown in FIG. 1. In this regard, a coupling member 26 is adapted to be telescopically received within and extend between the ends of corresponding left and right hand members thereby securing the members in their upwardly pivoted horizontal support orientation as described more fully below.

The invention is shown in FIG. 1 in its fully erected, operational configuration for supporting and carrying items above the truck bed in a manner similar to prior art truck racks. In use, elongated items such as ladders, pipes and the like are laid across the horizontal support beams 21 and 22 where they can be secured with twine or the like for transport.

FIG. 3 illustrates how the rack of the present invention can be collapsed and stored away within the receptacles 13 when not in use. The lower members 17 of arms 14 and 16 are seen to be pivotally secured at their bottom ends within a corresponding end of their receptacle 13. Specifically, the bottom end of each lower member is captured between a support plate 28 and the side of the receptacle and a pivot pin extends through the receptacle side, arm and plate. In this way, each of the arms 14 and 16 can be pivoted or hinged in the direction indicated by arrows 29 between a first vertically extending orientation and a second orientation within their corresponding receptacle 13.

Left and right hand members 23 and 24 of the horizontal beams can be decoupled and pivoted in the direction indicated by arrows 31 such that they lie adjacent to their corresponding arm as illustrated with the rear arms 14 in FIG. 3. In this regard, each left and right hand section is hingedly coupled to its corresponding arm by means of a universal joint type hinge 32 and a set of pins 33 are adapted to secure the members in place when they are pivoted upwardly to their horizontally extending support orientations.

Coupling members 26 are preferably sized to be telescopically received within the left and right hand members of support beams 21 and 22 for releasably coupling the members together for use. When coupling the members together in this way, the coupling members 26 are retracted far enough into one of the members to allow the ends of corresponding left and right members to be aligned, whereupon the coupling member is extended toward and into the facing member. The coupling member 26 can then be secured in position by means of pins 34 to maintain the left and right members in secure alignment.

FIG. 2 shows one of the receptacles 13 as it appears with its truck rack elements collapsed therein and with its protective cover 36 hinged shut over the receptacle. In this configuration, the truck rack and receptacle take up a relative small amount of space such that the entire assembly is collapsed out of the way and does not interfere with other uses of the truck.

OPERATION

To erect the truck rack of the present invention to its operative supporting configuration, a user simply opens each of the receptacles and hinges the arms 14 and 16 to their vertically extending orientations. The upper members 18 can then be telescoped to a desired height and locked into position by means of pins 19. The left and right support beam members 23 and 24 can then be pivoted upwardly to their horizontally extending orientations and releasably coupled together at their ends by corresponding coupling members 26. Thus erected, the rack is ready for use to support and carry ladders, pipes, and the like above the bed of the truck.

When not in use, the erection procedure is simply reversed with the components of the rack being collapsed and pivoted into their respective receptacles for storage.

The invention has been described in terms of a preferred embodiment. It will be obvious to those skilled in the art, however, that various modifications, additions and deletions might be made to the illustrated embodiment without departing from the scope of the invention. Various method of pivotally securing the lower member 17 to their receptacles might, for example, be employed. In addition, different methods of releasably securing the ends of right and left hand support beam members together might also be used with comparable results. These and other obvious modifications might well be made to the illustrated and preferred embodiment without departing from the spirit and scope of the invention as set for the claims.

I claim:

1. A collapsible rack assembly for use with a vehicle having a bed with upstanding parallel side walls, said rack assembly comprising:

first and second elongated receptacles adapted to be mounted to the side walls of the bed with each of said receptacles having first and second ends;

first and second elongated hollow lower members having first and second ends, each of said lower members being pivotally mounted at its first end to the first end of one of said receptacles and adapted to be swung from a position parallel to said receptacle to an upright position substantially perpendicular to said receptacle;

third and fourth elongated hollow lower members having first and second ends, each of said third and fourth lower members being pivotally mounted at its first end to the second end of one of said receptacles and adapted to be swung from a position parallel to said receptacle to an upright position substantially perpendicular to said receptacle;

a plurality of telescoping upper members, each of said upper members being slidably mounted within one of said hollow lower members and having a distal end;

a plurality of elongated hollow transverse members, each of said transverse members having first and second ends, with the first end thereof being pivotally mounted adjacent the distal end of one of said telescoping members and being adapted to be swung from a rest position to an extended position substantially at right angles to said telescoping member to which it is mounted to extend laterally across the bed; and a coupling member slidably mounted in at least one of said transverse members and adapted to be slidably inserted in a second transverse member laterally opposite said one transverse member when said second transverse member and said one member are in their extended positions.

2. A collapsible rack assembly for carrying items above a truck bed with said rack comprising:

first and second elongated arms having proximal and distal ends and being pivotally secured at their proximal ends to the rear of the truck bed in spaced transversely opposed relationship relative thereto, said first and second elongated arms being pivotable between support positions extending upwardly from the bed and storage positions extending along the bed;

third and fourth elongated arms having proximal and distal ends and being pivotally secured at their proximal ends to the front of the truck bed in spaced transversely opposed relationship relative thereto, said third and fourth elongated arms being pivotable between support positions extending upwardly from the bed and storage positions extending along the bed;

first, second, third and fourth elongated beam members each being hingedly secured at one end to the distal end of a corresponding one of said elongated arms, said beam members being movable between storage positions adjacent their respective arms and support positions extending transversely across the truck bed; and coupling means for releasably coupling the free ends of opposed ones of said beam members together when said beam members and said arms are in their respective support positions to define a rack for carrying items above the truck bed.

3. The rack assembly of claim 2 and further comprising receptacle means for receiving and housing said rack assembly when said elongated arms and said beam members are in their respective storage positions.

4. The rack assembly of claim 2 and wherein said coupling means comprises at least one elongated member sized to be telescopically received within the free ends of opposed beam members and extend therebetween when said beam members are in their support positions.

5. The rack assembly of claim 2 wherein said first, second, third, and fourth elongated arms are telescopically adjustable in length.

6. The rack assembly of claim 5 and further comprising means for securing said elongated arms at predetermined telescopically adjusted lengths.

7. The rack assembly of claim 2 wherein said elongated arms and said beam members are formed of tubular aluminum.

* * * * *